(12) United States Patent
Li

(10) Patent No.: US 11,843,986 B2
(45) Date of Patent: Dec. 12, 2023

(54) BEAM MEASUREMENT METHOD AND BEAM MEASUREMENT DEVICE

(71) Applicant: BEIJING XIAOMI MOBILE SOFTWARE CO., LTD., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/784,624

(22) PCT Filed: Dec. 13, 2019

(86) PCT No.: PCT/CN2019/125346
§ 371 (c)(1),
(2) Date: Jun. 10, 2022

(87) PCT Pub. No.: WO2021/114276
PCT Pub. Date: Jun. 17, 2021

(65) Prior Publication Data
US 2023/0009770 A1    Jan. 12, 2023

(51) Int. Cl.
*H04W 24/10*    (2009.01)
*H04W 36/00*    (2009.01)
(Continued)

(52) U.S. Cl.
CPC ...... *H04W 36/0085* (2018.08); *H04B 7/0632* (2013.01); *H04B 17/309* (2015.01); *H04B 17/382* (2015.01); *H04L 5/0048* (2013.01)

(58) Field of Classification Search
CPC .. H04B 17/309; H04B 17/327; H04B 17/382; H04B 7/024; H04B 7/0621; H04B 7/0632; H04L 5/0048; H04L 5/0051; H04L 5/0073; H04L 5/0094; H04W 16/28; H04W 36/0085
See application file for complete search history.

(56) References Cited

U.S. PATENT DOCUMENTS 10,595,241 B2    3/2020 Yue et al.
2017/0195033 A1    7/2017 Zhang et al.
(Continued)

FOREIGN PATENT DOCUMENTS

CN    105637939 A    6/2016
CN    107820717 A    3/2018
(Continued)

OTHER PUBLICATIONS

International Search Report of PCT/CN2019/125346 dated Aug. 26, 2020 with English translation, (4p).
(Continued)

*Primary Examiner* — Phuc H Tran
(74) *Attorney, Agent, or Firm* — Arch & Lake LLP

(57) ABSTRACT

A beam measurement method is provided. A terminal obtains beam measurement result reporting configuration of a neighbor cell, and determines a reference signal configuration of beam measurement of the neighbor cell. The terminal performs the beam measurement on the reference signal of the neighbor cell based on the reference signal configuration of the beam measurement. The terminal reports a beam measurement result of the neighbor cell.

17 Claims, 6 Drawing Sheets

(51) Int. Cl.
    *H04B 17/309*     (2015.01)
    *H04B 17/382*     (2015.01)
    *H04B 7/06*     (2006.01)
    *H04L 5/00*     (2006.01)

(56) References Cited

U.S. PATENT DOCUMENTS

| | | | |
|---|---|---|---|
| 2018/0176710 A1* | 6/2018 | Jang | H04W 4/70 |
| 2019/0132759 A1* | 5/2019 | Park | H04W 24/10 |
| 2019/0238287 A1 | 8/2019 | Zhou et al. | |
| 2019/0335367 A1 | 10/2019 | Yue et al. | |
| 2019/0335376 A1 | 10/2019 | Huang et al. | |
| 2020/0015273 A1* | 1/2020 | Zhang | H04B 7/088 |
| 2020/0022040 A1 | 1/2020 | Chen et al. | |
| 2020/0068420 A1* | 2/2020 | Chen | H04W 36/0085 |

FOREIGN PATENT DOCUMENTS

| | | |
|---|---|---|
| CN | 108271173 A | 7/2018 |
| CN | 110463260 A | 11/2019 |
| WO | 2018210234 A1 | 11/2018 |

OTHER PUBLICATIONS

Extended European Search Report issued in Application No. 19955547.5, dated Nov. 21, 2022, (16p).

Intel Corporation, "Summary of Discussion for NR RRM measurements" 3GPP TSG-RAN WG1#93, R1-1807628, e-Busan, South Korea, May 21-25, 2018, (10p).

* cited by examiner

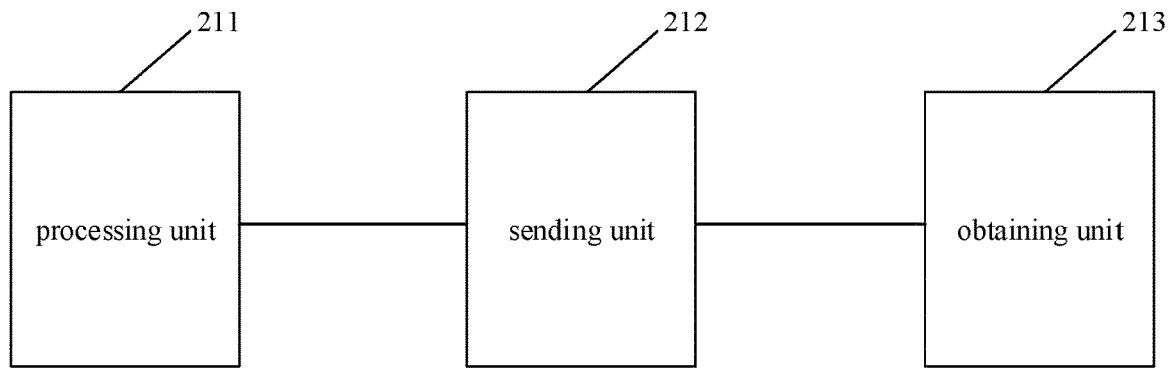
FIG. 7
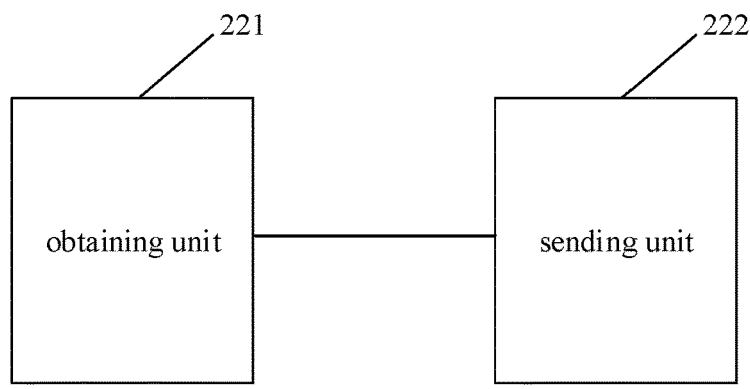
FIG. 8
FIG. 9
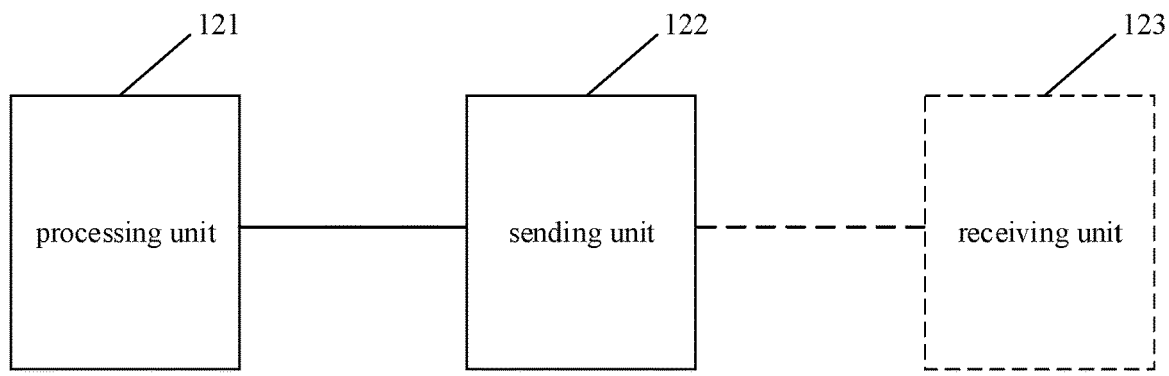

BEAM MEASUREMENT METHOD AND BEAM MEASUREMENT DEVICE

CROSS-REFERENCE TO RELATED APPLICATION

This application is a U.S. national phase application of International Application No. CT/CN2019/125346, filed on Dec. 13, 2019, the content of which is hereby incorporated by reference in its entirety for all purposes.

TECHNICAL FIELD

The disclosure relates to a field of communication technologies, and in particular, to a beam measurement method and a beam measurement device.

BACKGROUND

In a new radio (NR) communication system, due to the fast attenuation of high-frequency channels, in order to ensure coverage and resist path loss, the system usually transmits and receives data based on beams.

SUMMARY

According to a first aspect, there is provided a beam measurement method, performed by a terminal. The method includes:

obtaining a beam measurement result reporting configuration of a neighbor cell, and determining a reference signal configuration of beam measurement of the neighbor cell; performing beam measurement on the reference signal of the neighbor cell based on the reference signal configuration of the beam measurement, and reporting a beam measurement result of the neighbor cell.

According to a second aspect, there is provided a beam measurement method, applied to a network device. The network device is that to which a serving cell of a terminal belongs. The method includes:

determining and sending a beam measurement result reporting configuration of a neighbor cell and a reference signal configuration of beam measurement of the neighbor cell; and obtaining a beam measurement result of the neighbor cell.

It is understandable that the foregoing general description and the following detailed description are exemplary and explanatory and are not restrictive of the disclosure.

BRIEF DESCRIPTION OF THE DRAWINGS

The accompanying drawings, which are incorporated in and constitute a part of this specification, illustrate examples consistent with the disclosure and together with the description serve to explain the principles of the disclosure.

FIG. 7 is a block diagram illustrating a beam measurement apparatus according to an example.

FIG. 8 is a block diagram illustrating a beam measurement apparatus according to an example.

FIG. 9 is a block diagram illustrating a beam measurement apparatus according to an example.

DETAILED DESCRIPTION

Embodiments will be described in detail herein, examples of which are illustrated in the accompanying drawings. When the following description refers to the drawings, the same numerals in different drawings refer to the same or similar elements unless otherwise indicated. The implementations described in the illustrative examples below are not intended to represent all implementations consistent with this disclosure. Rather, they are merely examples of apparatus and methods consistent with some aspects of the disclosure as recited in the appended claims.

In the related art, one panel is used to transmit and receive data between the terminal and the network device. However, the terminal and the network device may have multiple panels. When the network device has multiple transmission and reception points (TRPs) and each TRP has one or more transmission panels, or the network device has one TRP and the TRP has multiple transmission panels, the base station can use multiple transmission panels (these multiple panels from the same TRP or different TRPs) to send data to the same terminal at the same time. When the terminal has multiple panels, the terminal can use multiple panels to send data to the network device.

In a multi-panel scenario, when multiple panels are used to communicate with multiple cells at the same time, the terminal can obtain better throughput. However, how the terminal performs beam measurement for neighbor cells is a problem to be solved.

Figure 1:
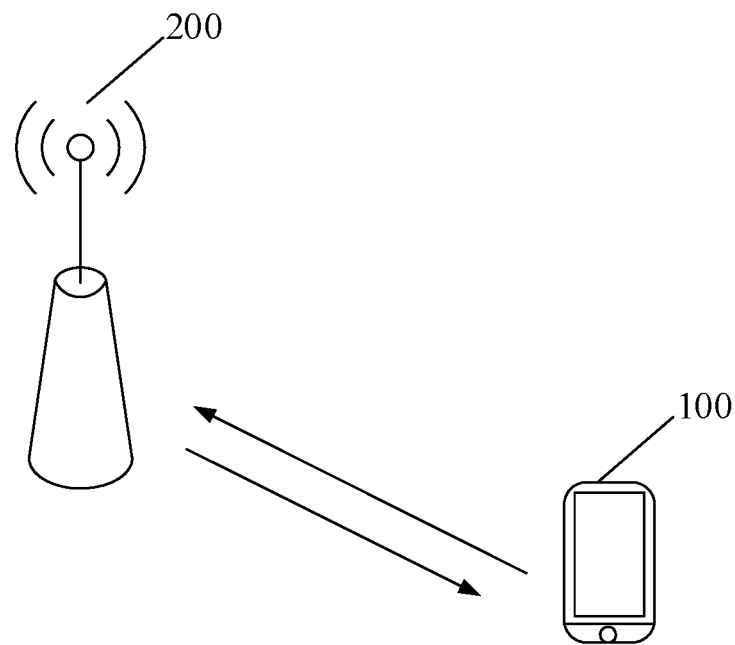
FIG. 1 is a schematic diagram illustrating a wireless communication system according to an example.

The beam measurement method according to examples of the disclosure can be applied to a wireless communication system illustrated in FIG. 1. As illustrated in FIG. 1, the wireless communication system includes a terminal 100 and a network device 200. The terminal 100 is connected to the network device 200 through wireless resources, and transmits and receives data to and from the network device 200.

It is understandable that the wireless communication system illustrated in FIG. 1 is an example. The wireless communication system may further include other network devices, such as core network devices, wireless relay devices, and wireless backhaul devices, which are not illustrated in FIG. 1. The number of network devices and the number of terminals included in the wireless communication system are not limited in the disclosure.

It is understandable that the wireless communication system according to example of the disclosure is a network that provides a wireless communication function. The wireless communication system can employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), Carrier Sense Multiple Access with Collision Avoidance. According to the capacity, speed, delay and other factors of different networks, the network can be classified into 2G (second generation) network, 3G (third generation) network, 4G (fourth generation) network or future evolution network, such as 5G (fifth generation) network. The 5G network can also be called a New Radio (NR). For convenience of description, the disclosure will refer to the wireless communication network simply as network.

Further, the network device 200 in the disclosure may also be referred to as radio access network device. The wireless access network device may be a base station, an evolved node B (base station), a home base station, an access point (AP) in a wireless fidelity (WIFI) system, a wireless relay node, a wireless backhaul node, a transmission point (TP) or a transmission and reception point (TRP), or gNB in an NR system, or a component or part of a device that constitutes the base station. When it is a vehicle-to-everything (V2X) communication system, the network device may be an in-vehicle device. It is understandable that, in the examples of the disclosure, the specific technology and specific device form adopted by the network device are not limited.

Further, the terminal 100 in the disclosure may also be referred to as terminal device, user equipment (UE), mobile station (MS), mobile terminal (MT), and is a device that provides voice and/or data connectivity to a user. For example, the terminal may be a handheld device with a wireless connection function, a vehicle-mounted device, or the like. Some examples of terminals are: Mobile Phone, Pocket Personal Computer (PPC), PDA, Personal Digital Assistant (PDA), notebook computer, tablet computer, wearable device, or on-vehicle equipment, etc. In addition, when it is a vehicle-to-everything (V2X) communication system, the terminal device may also be an in-vehicle device. It is understandable that examples of the disclosure do not limit the specific technology and specific device form adopted by the terminal.

In FIG. 1, the terminal 100 and the network device 200 transmit and receive data based on beams. In the related art, the terminal 100 and the network device 200 use one antenna panel to transmit and receive data. However, the terminal 100 and the network device 200 may respectively have multiple panels. When the network device 200 has multiple TRPs and each TRP has one or more transmission panels, or the network device 200 has one TRP and the TRP has multiple transmission panels, the network device 200 may use multiple panels (the multiple panels can be from the same TRP or different TRPs) to send data to the same user terminal 100 simultaneously. When the terminal 100 has multiple panels, the terminal 100 may use the multiple panels to send data to the network device 200 or receive data from the network device 200.

In a multi-panel scenario, it is assumed that the terminal has panel #1 and panel #2. When the terminal 100 moves to the cell edge, it may be measured on panel #1 that the serving cell has better performance, while on panel #2 that the neighbor cell has better service performance. In this case, if the terminal 100 continues to stay in the serving cell or switches to a neighbor cell, the throughput cannot be optimal. Because the terminal 100 may be in an overlapping position of the coverage of the two cells, the performance difference between the serving cell and the target cell on panel #1 and panel #2 may not be much, and the performance may change dynamically. For example, corresponding to the same panel, the performance of the serving cell is better than the neighbor cell in a period of time, and the performance of the neighbor cell is better than the serving cell in another period of time. In this case, if the terminal continues to stay in the serving cell or switches to the target cell for the panel #2, the performance cannot be optimal.

In view of this, examples of the disclosure provide a beam measurement method, to perform beam measurement on neighbor cells, such that different cells can simultaneously transmit data with the terminal based on beams. Therefore, the terminal can obtain better throughput, and dynamic beam switching can be realized. In addition, the terminal can measure the beam performance of the neighbor cells in advance, such that the target network device can quickly use the beams having better performance to transmit data to the terminal and realize fast switch.

In the disclosure, a triggering condition for performing the beam measurement on a neighbor cell is configured in advance, and when there is a need to perform the beam measurement on a neighbor cell, the beam measurement is performed on the neighbor cell. In the disclosure, the beam measurement performed on the neighbor cell may be triggered by one of more of a radio resource management (RRM) measurement result of the serving cell, a beam measurement result of the serving cell, a channel quality indicator (CQI) measurement result of the serving cell, and the RRM measurement result of the neighbor cell.

In the disclosure, the triggering condition for performing the beam measurement on the neighbor cell includes one or a combination of the following: the RRM measurement result of the serving cell being less than a first threshold; the beam measurement result of the serving cell being less than a second threshold; the CQI measurement result of the serving cell being less than a third threshold; the RRM measurement result of the neighbor cell being greater than a fourth threshold; an absolute value of a difference between the RRM measurement result of the neighbor cell and the RRM measurement result of the serving cell being less than a preset threshold.

The RRM measurement result of the serving cell being less than the first threshold refers to that the RRM measurement value of the serving cell is very small and less than a preset threshold. The RRM measurement value includes reference signal received power (RSRP) of layer 3, reference signal received quality (RSRQ) of layer 3, signal to interference & noise ratio (SINR) of layer 3, etc. The value of layer 3 is obtained by averaging sampling values of many layers 1 and passing through the sliding window.

The beam measurement result of the serving cell being less than the second threshold refers to that the beam measurement value L1-RSRP and L1-SINR of the serving cell are very small. For example, the highest beam measurement value is less than a preset threshold. The measurement value of layer 1 is a sampling value of the physical layer.

The CQI measurement result of the serving cell being less than the third threshold refers to that the CQI measurement value of the serving cell is very small and less than a preset threshold.

The RRM measurement result of the neighbor cell being greater than the fourth threshold refers to that the RRM measurement value of the neighbor cell, such as RSRP, RSRQ, SINR, is higher than a certain threshold.

It is understandable that, in the disclosure, the first threshold, the second threshold, the third threshold, and the fourth threshold are different. In addition, the thresholds corresponding to RSRP, RSRQ, and SINR are different.

The absolute value of the difference between the RRM measurement result of the neighbor cell and the RRM measurement result of the serving cell being less than the preset threshold refers to that the difference between the RRM measurement value of the neighbor cell and the RRM measurement value of the serving cell is within a range, such as greater than offset1 and less than offset2. The offset1 can be greater than or equal to 0. Certainly, offset1 can be less than 0. The offset2 is greater than the offset1. The offset2 can be the offset value of the switch. That is, when the difference between the RRM measurement value of the neighbor cell and the RRM measurement value of the serving cell is greater than or equal to offset2, the switch to the neighbor cell is performed by the terminal. When the RRM measurement value of the neighbor cell is greater than the RRM measurement value of the serving cell, but the difference is less than offset 2, the switch to the neighbor cell is not performed, which can prevent the ping-pong effect and avoid a situation that the RRM measurement value of the serving cell after performing the switch to the neighbor cell becomes stronger.

In the disclosure, the triggering condition for performing the beam measurement on the neighbor cell may be configured separately by the network device to which the serving cell of the terminal belongs for the terminal, or not configured separately and may be configured by reusing the existing measurement configuration and measurement result reporting configuration. For example, the triggering condition that the absolute value of the difference between the RRM measurement result of the neighbor cell and the RRM measurement result of the serving cell is less than the preset threshold may be configured independently by the network device to which the serving cell of the terminal belongs for the terminal. When the terminal detects that the triggering condition for performing the beam measurement on the neighbor cell is met, the measurement result needs to be reported to the network device to which the serving cell belongs according to the measurement reporting configuration corresponding to the triggering condition for performing the beam measurement. After the network device to which the serving cell belongs receives the reported measurement result, it is determined whether to trigger the beam measurement of the neighbor cell.

In an implementation of the disclosure, the terminal obtains the beam measurement result reporting configuration of the neighbor cell, determines the reference signal configuration of the beam measurement of the neighbor cell, performs the beam measurement on the reference signal of the neighbor cell based on the reference signal configuration of the beam measurement, and reports the beam measurement result of the neighbor cell.

In another implementation of the disclosure, when determining that there is a need to trigger the beam measurement on the neighbor cell, the network device to which the serving cell belongs determines a sounding reference signal configuration for the beam measurement of the neighbor cell sent by the terminal, sends a beam measurement request to the network device to which the neighbor cell of the terminal belongs, and obtains the beam measurement result report sent by the network device to which the neighbor cell belongs. The beam measurement request includes the sounding reference signal configuration for the beam measurement of the neighbor cell.

Figure 2:
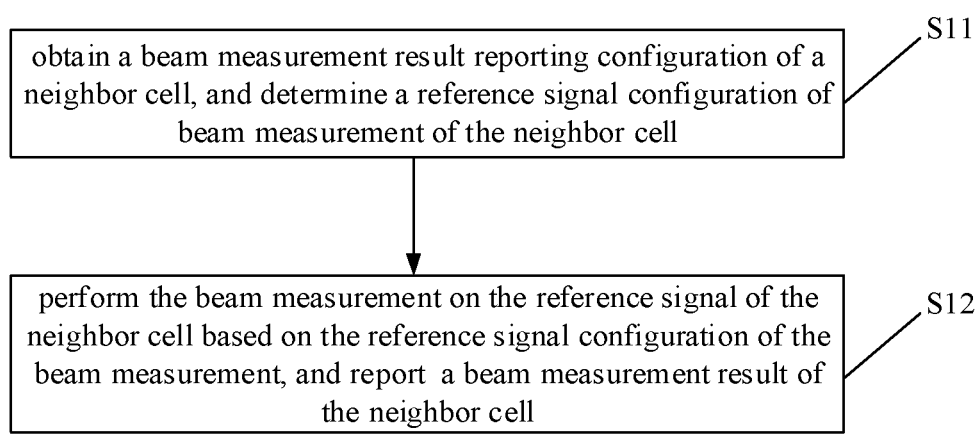
FIG. 2 is a flowchart illustrating a beam measurement method according to an example.

FIG. 2 is a flowchart illustrating a beam measurement method according to an example. As illustrated in FIG. 2, the beam measurement method is applied to a terminal and includes the following.

In block S11, a beam measurement result reporting configuration of a neighbor cell is obtained, and a reference signal configuration of beam measurement of the neighbor cell is determined.

In block S12, the beam measurement is performed on the reference signal of the neighbor cell based on the reference signal configuration of the beam measurement, and the beam measurement result of the neighbor cell is reported.

In the disclosure, the terminal receives a configuration of a triggering condition for performing the beam measurement on the neighbor cell.

The specific process is as follows. The network device to which the serving cell belongs sends the configuration of the triggering condition for performing the beam measurement on the neighbor cell and the measurement result reporting configuration. The terminal measures the serving cell and the neighbor cell based on the configuration of the triggering condition for performing the beam measurement on the neighbor cell. When the triggering condition is met, the terminal feeds the measurement result back to the network device to which the serving cell belongs based on the beam measurement result reporting configuration. After receiving the measurement result fed back based on the triggering condition for performing the beam measurement on the neighbor cell, the network device to which the serving cell belongs determines that it needs to perform the beam measurement on the neighbor cell. The triggering condition for performing the beam measurement on the neighbor cell may be that the RRM measurement result of the serving cell is less than the first threshold, or the beam measurement result of the serving cell is less than the second threshold, or the CQI measurement result of the serving cell is less than the third threshold, or the RRM measurement result of the neighbor cell is greater than the fourth threshold; or the absolute value of the difference between the RRM measurement result of the neighbor cell and the RRM measurement result of the serving cell is less than the preset threshold.

When detecting that the triggering condition for performing the beam measurement on the neighbor cell is met, the terminal reports to the network device to which the serving cell of the terminal belongs. The network device to which the serving cell of the terminal belongs determines that it needs to perform the beam measurement on the neighbor cell and the beam measurement is performed by the terminal, the network device to which the serving cell belongs at least sends "the beam measurement result reporting configuration of the neighbor cell" to the terminal. After receiving the beam measurement result reporting configuration of the neighbor cell, the terminal needs to start to measure the beams of the neighbor cell, and determines the reference signal configuration of the beam measurement of the neighbor cell. The reference signal configuration of the beam measurement of the neighbor cell may be, on the one hand, determined by searching the reference signals of the neighbor cells by the terminal itself and performing the measurement.

On the other hand, the network device to which the serving cell of the terminal belongs may send the reference signal configuration request of the beam measurement to the network device to which the neighbor cell belongs. The network device to which the neighbor cell belongs sends its own reference signal configuration of the beam measurement to the network device to which the serving cell of the terminal belongs. The network device to which the serving cell of the terminal belongs sends the reference signal configuration of the beam measurement to the terminal.

In the disclosure, the reference signal configuration of the beam measurement includes one or a combination of the following: a neighbor cell identifier (ID), a neighbor cell TRP ID or a Panel ID, and may also include time-frequency resources position and period of the reference signal of the beam measurement, etc.

In the disclosure, the reference signal of the beam measurement of the neighbor cell may be a synchronization signal block (SSB) sent by the network device to which the neighbor cell belongs, or may be a channel state information-reference signal (CSI-RS) sent by the network device to which the neighbor cell belongs. For example, the reference signal of the beam measurement of the neighbor cell that is searched for by terminal may be the SSB. The reference signal of the beam measurement of the neighbor cell configured by the network device to which the serving cell belongs for the terminal may be the SSB and CSI-RS sent by the network device to which the neighbor cell belongs.

In the disclosure, the beam measurement result reporting configuration of the neighbor cell can be understood as being used by the network device to which the serving cell of the terminal belongs to instruct the terminal to start to perform the beam measurement on the neighbor cell.

In the disclosure, performing by the terminal the beam measurement on the neighbor cell can be understood as that the terminal measures the reference signal of the neighbor cell to obtain the reference signal measurement value corresponding to each reference signal identifier, such as L1-RSRP, L1-RSRQ and L1-SINR.

In an implementation of the disclosure, when there is a conflict between the time of performing the beam measurement on the reference signal of the neighbor cell and the time of transmitting data with the serving cell, the data transmission with the serving cell is maintained and the beam measurement performed on the neighbor cell is stopped, to ensure the reliability of the data transmission. The data transmission with the serving cell includes uplink and downlink data transmission, which includes but is not limited to one or more of reference signals, physical downlink control channel (PDCCH), physical downlink shared channel (PDSCH), physical uplink control channel (PUCCH), physical uplink shared channel (PUSCH), physical random access channel (PRACH). The time of performing the beam measurement on the reference signal of the neighbor cell conflicting with the time of transmitting with the serving cell can be understood as that the beam direction used for the data transmission with the serving cell collides the beam direction used for measuring the reference signal of the neighbor cell. That is, the time is the same, but the beam directions used are different. The beam direction used for the data transmission with the serving cell may be a transmission reference signal or a beam direction of transmitting the data.

In the disclosure, the beam measurement result of the neighbor cell reported by the terminal may be one or a combination of the following: a neighbor cell ID, an antenna panel ID, a group ID, a reference signal ID, L1-RSRP, L1-RSRQ, and L1-SINR. The reference signal ID may be, for example, a channel state information reference signal (CSI-RS), a CSI-RS ID or an SSB ID.

Further, in the disclosure, the beam measurement result of the neighbor cell reported by the terminal may be the reference signal measurement result reported based on the group. Multiple reference signals in the group are reference signals that can be received by the terminal simultaneously, or multiple reference signals in the group are the reference signals that cannot be received by the terminal simultaneously. For example, the multiple reference signals in the group may be different reference signals received by the terminal in different beam directions using the same antenna panel, or the multiple reference signals in the group may be different reference signals received by the terminal using different antenna panels.

Further, in the disclosure, after reporting the beam measurement result of the neighbor cell, the terminal may obtain the transmission configuration indication (TCI) of the neighbor cell sent by the network device to which the serving cell belongs.

Figure 3:
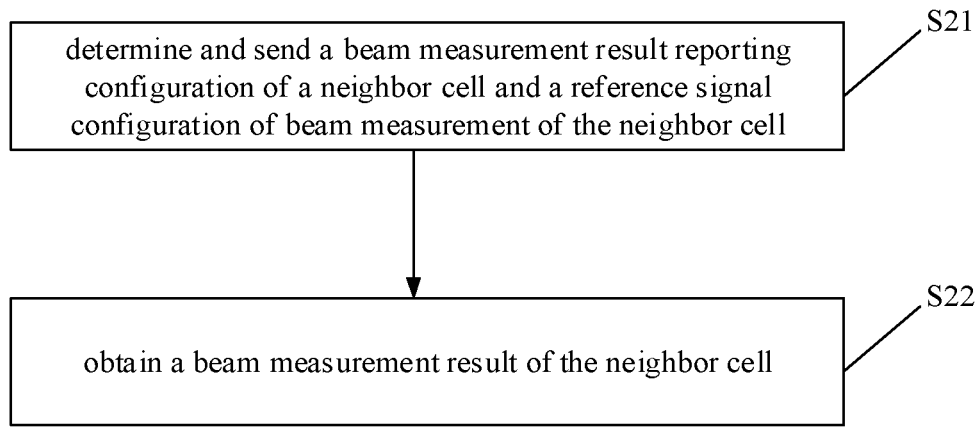
FIG. 3 is a flowchart illustrating a beam measurement method according to an example.

FIG. 3 is a flowchart illustrating a beam measurement method according to an example. As illustrated in FIG. 3, the beam measurement method is applied to a network device. The network device may be a network device to which a serving cell of a terminal belongs. The method includes the following.

In block S21, a beam measurement result reporting configuration of a neighbor cell and a reference signal configuration of the beam measurement of the neighbor cell are determined and sent.

In block S22, a beam measurement result of the neighbor cell is obtained.

In an implementation, the network device to which the serving cell belongs configures the triggering condition for performing the beam measurement on the neighbor cell, and sends the triggering condition for performing the beam measurement on the neighbor cell and the measurement result reporting configuration to the terminal. The terminal measures the serving cell and the neighbor cell based on the triggering condition for performing the beam measurement on the neighbor cell. When the triggering condition is met, the terminal feeds the measurement result back to the network device to which the serving cell belongs based on the measurement result reporting configuration. After receiving the measurement result fed back based on the triggering condition for performing the beam measurement on the neighbor cell, the network device to which the serving cell belongs determines that it needs to trigger the beam measurement on the neighbor cell. The triggering condition for performing the beam measurement on the neighbor cell includes one or a combination of the following: a RRM measurement result being less than a first threshold; a beam measurement result being less than a second threshold; a CQI measurement result being less than a third threshold; the RRM measurement result of the neighbor cell being greater than a fourth threshold; an absolute value of a difference between the RRM measurement result of the neighbor cell and the RRM measurement result of a current cell being less than a preset threshold. When the triggering condition is not met, the terminal may not feed the measurement result based on the triggering condition for performing the beam measurement on the neighbor cell to the network device.

In some implementations, the network device to which the serving cell belongs determines that it needs to perform the beam measurement on the neighbor cell based on the measurement result fed back by the terminal based on the triggering condition for performing the beam measurement on the neighbor cell, and it needs to determine the reference signal configuration of the beam measurement of the neighbor cell. When determining the reference signal configuration of the beam measurement of the neighbor cell, the network device to which the serving cell belongs sends a reference signal configuration request of the beam measurement to the network device to which the neighbor cell belongs, and obtains the reference signal configuration of the beam measurement of the neighbor cell sent by the network device to which the neighbor cell belongs. The network device to which the serving cell belongs sends the reference signal configuration of the beam measurement of the neighbor cell to the terminal. The reference signal configuration includes one or a combination of the following: a neighbor cell ID, a neighbor cell TRP ID or an antenna panel ID, a reference signal ID, a reference signal time-frequency resources location and period.

The reference signal of the beam measurement of the neighbor cell is the SSB or CSI-RS sent by the neighbor cell.

The beam measurement result report of the neighbor cell includes one or a combination of the following: a neighbor cell ID, an antenna panel ID, a group ID, a reference signal ID, a L1-RSRP, a L1-RSRQ, a L1-SINR, and the like.

Further, in the disclosure, the beam measurement result of the neighbor cell is a group-based beam measurement result of the neighbor cell. Multiple reference signals in the group are reference signals that can be received by the terminal simultaneously, or multiple reference signals in the group are reference signals that cannot be received by the terminal simultaneously.

In the disclosure, the network device to which the serving cell belongs may acquire the TCI value of the neighbor cell, and send the TCI value of the neighbor cell to the terminal.

It is understandable that, the beam measurement method according to examples of the disclosure can be applied to a process of interaction between the terminal and the network device. For the execution process of the terminal and the network device in the interaction process, reference may be made to the relevant descriptions of the above-mentioned examples, and details are not repeated here.

In the disclosure, the terminal performs the beam measurement on the neighbor cell, such that different cells can simultaneously transmit data to the terminal based on the beams. Therefore, the terminal can obtain better throughput and the dynamic switching of the beams is realized. In addition, the terminal measures the beam performances of the neighbor cells in advance, such that the target network device can quickly use a better beam to transmit data to the terminal and realize fast switch.

In examples of the disclosure, the network device to which the serving cell of the terminal belongs may perform the beam measurement on the neighbor cell.

Figure 4:
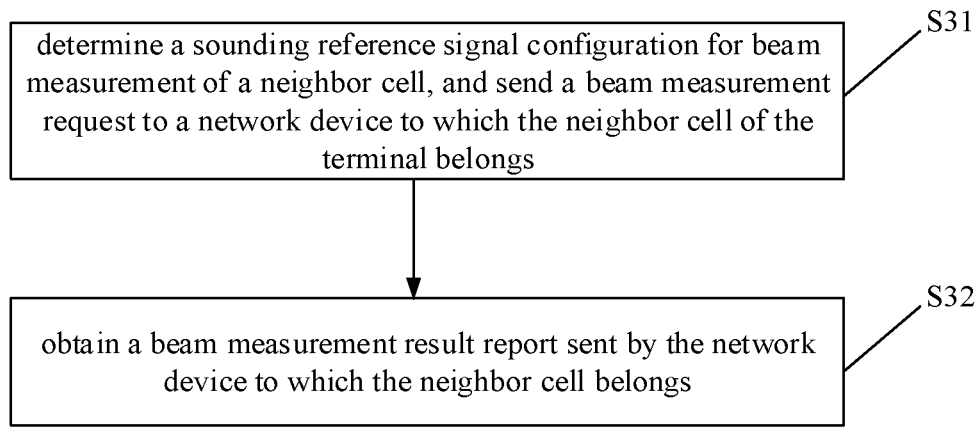
FIG. 4 is a flowchart illustrating a beam measurement method according to an example.

FIG. 4 is a flowchart illustrating a beam measurement method according to an example, which is applied to a network device to which a serving cell belongs. The method includes the following.

In block S31, a sounding reference signal configuration of beam measurement of a neighbor cell is determined, and a beam measurement request is sent to the network device to which the neighbor cell of the terminal belongs.

In the disclosure, the network device to which the serving cell belongs configures the triggering condition for performing the beam measurement on the neighbor cell and the measurement result reporting configuration, and sends the triggering condition for performing the beam measurement on the neighbor cell and the measurement result reporting configuration. The terminal measures the serving cell and the neighbor cell based on the triggering condition for performing the beam measurement on the neighbor cell. When the triggering condition is met, the terminal feeds the measurement result to the network device back to which the serving cell belongs based on the measurement result reporting configuration. After receiving the measurement result fed back based on the triggering condition for performing the beam measurement on the neighbor cell, the network device to which the serving cell belongs determines that it needs to trigger the beam measurement on the neighbor cell. Further, the network device to which the serving cell belongs determines a sounding reference signal configuration for beam measurement of the neighbor cell, and sends a beam measurement request to the network device to which the neighbor cell of the terminal belongs. When the trigger condition is not met, the terminal may not feed the measurement result based on the triggering condition for performing the beam measurement on the neighbor cell back to the network device.

In the disclosure, the beam measurement request sent by the network device to which the serving cell belongs to the network device to which the neighbor cell of the terminal belongs includes a sounding reference signal (SRS) configuration for beam measurement of the neighbor cell. The SRS for the beam measurement of the neighbor cell is sent by the terminal. The network device to which the serving cell belongs determines the SRS configuration for the beam measurement of the neighbor cell sent by the terminal. The beam measurement request sent to the network device to which the neighbor cell of the terminal belongs includes the SRS configuration for the beam measurement of the neighbor cell. In this way, the terminal sends the SRS, and the network device to which the neighbor cell belongs performs the beam measurement based on the SRS sent by the terminal.

Further, in the disclosure, the beam measurement request sent to the network device to which the neighbor cell of the terminal belongs may further include the terminal identifier, to inform the network device to which the neighbor cell belongs to determine the terminal that sends the SRS for the measurement.

The network device to which the serving cell belongs sends the beam measurement request to the network device to which the neighbor cell of the terminal belongs, the network device to which the neighbor cell belongs that receives the beam measurement request performs the beam measurement and sends a beam measurement result report to the network device to which the serving cell belongs.

In block S32, a beam measurement result report sent by the network device to which the neighbor cell belongs is obtained.

In an implementation, the triggering condition for performing the beam measurement on the neighbor cell includes one or a combination of the following: a RRM measurement result being less than a first threshold; the beam measurement result being less than a second threshold; a CQI measurement result being less than a third threshold; a RRM measurement result of the neighbor cell being greater than a fourth threshold; an absolute value of a difference between the RRM measurement result of the neighbor cell and the RRM measurement result of a current cell being less than a preset threshold.

Further, the SRS configuration in the disclosure may include one or more of the following combinations: time-frequency resources of the SRS being periodic or aperiodic, all parameters related to the SRS, such as the SRS ID, the terminal ID, the terminal antenna panel ID, etc.

In some implementations, after the terminal has been sent some SRSs, and the network device to which the serving cell belongs determines that these SRSs can be used for the beam measurement of the neighbor cell, the SRS configuration for the beam measurement of the neighbor cell reuses the SRS configuration used by the terminal for other purposes. For example, the SRS that has been sent can be used for beam measurement, channel measurement, or antenna switching of the serving cell. That is to say, the SRS for the beam measurement of the neighbor cell and the SRS used for other purposes can be the same SRS.

In the disclosure, the SRS used for other purposes may be the SRS for beam measurement of the serving cell of the terminal, or the SRS used for the channel measurement of the serving cell in codebook and noncodebook scenarios, or the SRS used for antenna switching when communicating with the serving cell.

In some implementations, when the SRS that the terminal has been sent is different from the SRS configuration for the beam measurement of the neighbor cell, or the terminal does not send any SRS, the network device to which the serving cell belongs can configure the SRS configuration for the beam measurement of the neighbor cell for the terminal.

Further, in the disclosure, the network device to which the serving cell belongs may send the SRS configuration for beam measurement of the neighbor cell to the terminal, to request the terminal to send the SRS based on the configuration, such that the network device to which the neighbor cell belongs can perform the beam measurement.

In the disclosure, the SRS configuration sent to the terminal may include usage. The usage is beam management or the beam management of the neighbor cells.

In the disclosure, after the network device to which the neighbor cell belongs performs the beam measurement, the beam measurement result report is sent to the network device to which the serving cell belongs. The beam measurement result report includes one or more of: a neighbor cell ID, an antenna panel ID, a group ID, a terminal ID, an SRS ID, and an SRS measurement value.

In the disclosure, the beam measurement result report of the neighbor cell may be a group-based measurement result report. Multiple SRSs in the group are SRS signals that can be received by the neighbor cell simultaneously, or multiple SRSs in the group are SRS signals that cannot be received by the neighbor cell simultaneously.

Further, in the disclosure, after the network device to which the serving cell belongs receives the beam measurement result sent by the network device to which the neighbor cell of the terminal belongs, the TCI state of the network device to which the neighbor cell belongs can be determined based on the beam measurement result report of the neighbor cell. For example, the uplink beam used in uplink transmission is sent to the terminal.

Figure 5:
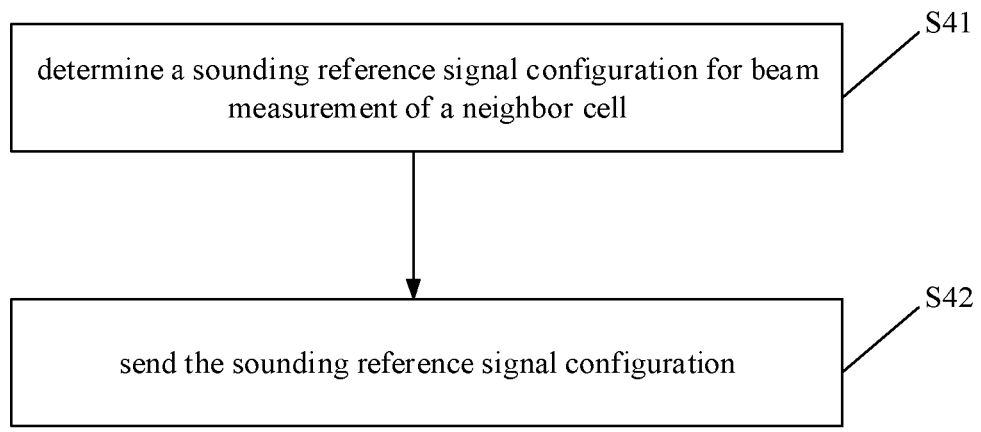
FIG. 5 is a flowchart illustrating a beam measurement method according to an example.

FIG. 5 is a flowchart illustrating a beam measurement method according to an example. As illustrated in FIG. 5, the beam measurement method is applied to a terminal. The method includes the following.

In block S41, a sounding reference signal configuration for beam measurement of the neighbor cell is determined.

In the disclosure, the network device to which the serving cell belongs sends the configuration of a triggering condition for performing the beam measurement on the neighbor cell and the measurement result configuration. The terminal obtains the configuration of the triggering condition for performing the beam measurement on the neighbor cell and the measurement result configuration sent by the network device to which the serving cell belongs, and measures the serving cell and the neighbor cell according to the configuration of the triggering condition for performing the beam measurement on the neighbor cell. When the triggering condition is met, the terminal feeds the measurement result back to the network device to which the serving cell belongs according to the measurement result reporting configuration. After receiving the measurement result fed back based on the triggering condition for performing the beam measurement on the neighbor cell, the network device to which the serving cell belongs determines that it needs to trigger the beam measurement of the neighbor cell. The triggering condition for performing the beam measurement on the neighbor cell includes one or a combination of the following:

a RRM measurement result of the serving cell being less than a first threshold; a beam measurement result of the serving cell being less than a second threshold; a channel quality indicator (CQI) measurement result of the serving cell being less than a third threshold; the RRM measurement result of the neighbor cell being greater than a fourth threshold; an absolute value of a difference between the RRM measurement result of the neighbor cell and the RRM measurement result of the serving cell being less than a preset threshold.

In an implementation, the sounding reference signal configuration is multiplexed by the terminal for other purposes. In another implementation, the terminal receives the sounding reference signal configuration for beam measurement of the neighbor cell sent by a network device to which the serving cell belongs.

In block S42, a sounding reference signal is sent.

In an implementation, the terminal may obtain a transmission configuration value of the neighbor cell sent by the network device to which the serving cell belongs.

The transmission configuration of the neighbor cell is determined by the network device to which the serving cell belongs according to the beam measurement result report of the neighbor cell sent by the neighbor cell. The beam measurement result report of the neighbor cell includes one or more of a neighbor cell ID, an antenna panel ID, a group ID, a terminal ID, an SRS ID, an SRS measurement value, and the like.

In another implementation, the beam measurement result report of the neighbor cell is a group-based measurement result report, Multiple SRS signals in the group are SRS signals that can be received by the neighbor cell simultaneously, or multiple SRS signals in the group are SRS signals that cannot be received by the neighbor cell simultaneously.

It is understandable that, the beam measurement method according to examples of the disclosure can be applied to a process of interaction between the terminal and the network device. For the execution process of the terminal and the network device in the interaction process, reference may be made to the relevant descriptions of the above-mentioned examples, and details are not repeated here.

In the disclosure, the network device to which the neighbor cell belongs performs the beam measurement on the neighbor cell, such that different cells simultaneously transmit the data to the terminal based on the beams. Therefore, the terminal can obtain better throughput and the dynamic switching of beams can be realized.

Based on the same concept, examples of the disclosure provide a beam measurement apparatus.

It is understandable that, in order to implement the above-mentioned functions, the beam measurement apparatus according to examples of the disclosure includes corresponding hardware structures and/or software modules for executing each function. Combining with the units and algorithm steps of each example disclosed in examples of the disclosure, examples of the disclosure can be implemented in hardware or a combination of hardware and computer software. Whether a function is performed by hardware or computer software driving hardware depends on the specific application and design constraints of the technical solution. Those skilled in the art may use different methods to implement the described functions for each specific application, but such implementation should not be considered beyond the scope of the technical solutions of examples of the disclosure.

Figure 6:
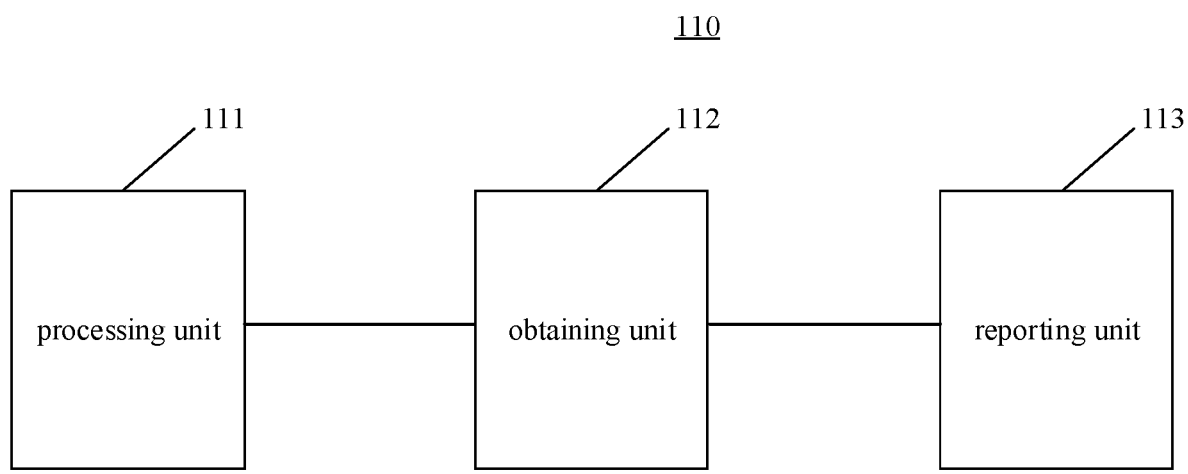
FIG. 6 is a block diagram illustrating a beam measurement apparatus according to an example.

FIG. 6 is a block diagram illustrating a beam measurement apparatus according to an example. As illustrated in FIG. 6, the beam measurement apparatus 110 is applied to a terminal. The apparatus includes a processing unit 111, an obtaining unit 112 and a reporting unit 113.

The obtaining unit 112 is configured to obtain a beam measurement result reporting configuration of a neighbor cell. The processing unit 111 is configured to determine a reference signal configuration of beam measurement of a neighbor cell. The reporting unit 113 is configured to perform beam measurement on the reference signal of the neighbor cell according to the reference signal configuration of the beam measurement, and report the beam measurement result of the neighbor cell.

In an implementation, the processing unit 111 is further configured to receive a configuration of a triggering condition for performing the beam measurement on the neighbor cell. The triggering condition for performing the beam measurement on the neighbor cell includes one or a combination of the following:
  a radio resource management (RRM) measurement result of a serving cell being less than a first threshold.
  a beam measurement result of the serving cell being less than a second threshold.
  a channel quality indicator (CQI) measurement result o the serving cell being less than a third threshold.
  the RRM measurement result of the neighbor cell being greater than a fourth threshold.
  an absolute value of a difference between the RRM measurement result of the neighbor cell and the RRM measurement result of the serving cell being less than a preset threshold.

In an implementation, the processing unit 111 is configured to obtain a reference signal configuration of the beam measurement of the neighbor cell from the network device to which the serving cell belongs, and send the reference signal configuration of the beam measurement of the neighbor cell to the network device to which the serving cell belongs. The reference signal configuration of the beam measurement of the neighbor cell is determined by the network device to which the neighbor cell belongs based on the reference signal configuration of the beam measurement sent by the network device to which the serving cell belongs.

In another implementation, the processing unit 111 is configured to determine the reference signal configuration of the beam measurement of the neighbor cell based on the searched reference signals of beam measurement of neighbor cells.

In another implementation, the reference signal of the beam measurement of the neighbor cell is the SSB or CSI-RS sent by the neighbor cell.

In another implementation, the processing unit 111 is further configured to:
  in response to determining that the time of transmitting data with the serving cell collides with the time of performing the data transmission on the reference signal of the neighbor cell, maintaining the data transmission with the serving cell and stopping performing the beam measurement on the reference signal of the neighbor cell.

In another implementation, the beam measurement result of the neighbor cell includes one or a combination of the following: a neighbor cell identifier, an antenna panel identifier, a group identifier, a reference signal identifier, a reference signal received power of layer 1, a reference signal received quality of layer 1, and a signal to interference & noise ratio of layer 1.

In another implementation, the beam measurement result of the neighbor cell is a group-based measurement result. Multiple reference signals in the group are reference signals that can be received by the terminal simultaneously, or multiple reference signals in the group are reference signals that cannot be received by the terminal simultaneously.

In another implementation, the obtaining unit 112 is further configured to:
  obtain a transmission configuration value of the neighbor cell sent by the network device to which the serving cell belongs.

FIG. 7 is a block diagram illustrating a beam measurement apparatus according to an example. As illustrated in FIG. 7, the beam measurement apparatus 210 is applied to a network device to which the serving cell belongs. The apparatus includes a processing unit 211, a sending unit 212 and an obtaining unit 213.

The processing unit 211 is configured to determine a beam measurement result reporting configuration of a neighbor cell and a reference signal configuration of beam measurement of the neighbor cell. The sending unit 212 is configured to send the beam measurement result reporting configuration of the neighbor cell and the reference signal configuration of the beam measurement of the neighbor cell. The obtaining unit 213 is configured to obtain a beam measurement result of the neighbor cell.

In an implementation, the processing unit 211 is configured to configure a triggering condition for performing the beam measurement on the neighbor cell. The triggering condition for performing the beam measurement on the neighbor cell includes one or a combination of the following:
  a radio resource management (RRM) measurement result being less than a first threshold.
  a beam measurement result being less than a second threshold.
  a channel quality indicator (CQI) measurement result being less than a third threshold.
  a RRM measurement result of the neighbor cell being greater than a fourth threshold.
  an absolute value of a difference between the RRM measurement result of the neighbor cell and the RRM measurement result of a current cell being less than a preset threshold.

In an implementation, the sending unit 212 is further configured to send a reference signal configuration request of the beam measurement to the network device to which the neighbor cell belongs. The obtaining unit 213 is further configured to obtain the reference signal configuration of the beam measurement of the neighbor cell sent by the network device to which the neighbor cell belongs.

In an implementation, the reference signal of the beam measurement of the neighbor cell is the synchronization signal block (SSB) or the channel state information reference signal (CSI-RS) sent by the neighbor cell.

In an implementation, the beam measurement result of the neighbor cell includes one or a combination of the following: a neighbor cell identifier, an antenna panel identifier, a group identifier, a reference signal identifier, a reference signal received power of layer 1, a reference signal received quality of layer 1, and a signal to interference & noise ratio of layer 1.

In an implementation, the beam measurement result of the neighbor cell is a group-based beam measurement result of the neighbor cell. Multiple reference signals in the group are reference signals that can be received by the terminal simultaneously, or multiple reference signals in the group are the reference signals that cannot be received by the terminal simultaneously.

In an implementation, the obtaining unit 213 is further configured to: obtain a transmission configuration value of the neighbor cell. The sending unit 212 is further configured to send the transmission configuration value of the neighbor cell.

FIG. 8 is a block diagram illustrating a beam measurement apparatus according to an example. As illustrated in FIG. 8, the beam measurement apparatus 220 is applied to a network device to which the serving cell belongs. The apparatus includes an obtaining unit 221 and a sending unit 222.

The obtaining unit 221 is configured to determine a sounding reference signal configuration for beam measurement of a neighbor cell, and obtain a beam measurement result report sent by a network device to which the neighbor cell belongs. The sending unit 222 is configured to send a beam measurement request to a network device to which a neighbor cell of the terminal belongs. The beam measurement request includes the sounding reference signal configuration for the beam measurement of the neighbor cell.

In an implementation, the sounding reference signal configuration is multiplexed by the terminal for other purposes.

In an implementation, the sending unit 222 is further configured to send the sounding reference signal configuration for the beam measurement of the neighbor cell to the terminal.

In an implementation, the processing unit 221 is configured to configure a triggering condition for performing the beam measurement on the neighbor cell. The triggering condition for performing the beam measurement on the neighbor cell includes one or a combination of the following:

a radio resource management (RRM) measurement result being less than a first threshold.
  a beam measurement result being less than a second threshold.
  a channel quality indicator (CQI) measurement result being less than a third threshold.
  a RRM measurement result of the neighbor cell being greater than a fourth threshold.
  an absolute value of a difference between the RRM measurement result of the neighbor cell and the RRM measurement result of a current cell being less than a preset threshold.

In an implementation, the beam measurement result report includes one or more of a neighbor cell identifier, an antenna panel identifier, a terminal identifier, a group identifier, a sounding reference signal identifier, and a sounding reference signal measurement value.

In an implementation, the beam measurement result report of the neighbor cell is a group-based measurement result report. Multiple sounding reference signals in the group are the sounding reference signals that can be received by the neighbor cell simultaneously, or multiple sounding reference signals in the group are sounding reference signals that cannot be received by the neighbor cell simultaneously.

In an implementation, the sending unit 222 is further configured to determine and send the transmission configuration value of the neighbor cell according to the beam measurement result report of the neighbor cell to the terminal.

FIG. 9 is a block diagram illustrating a beam measurement apparatus according to an example. As illustrated in FIG. 9, the beam measurement apparatus 120 is applied to a terminal. The apparatus includes a processing unit 121 and a sending unit 122.

The processing unit 121 is configured to determine a sounding reference signal configuration for beam measurement of a neighbor cell. The sending unit 122 is configured to send the sounding reference signal configuration.

In an implementation, the sounding reference signal configuration is multiplexed by the terminal for other purposes.

In an implementation, the beam measurement apparatus 120 further includes a receiving unit 123. The receiving unit 123 is configured to receive the sounding reference signal configuration for the beam measurement of the neighbor cell sent by a network device to which the serving cell belongs.

In another implementation, the processing unit 121 is further configured to receive a configuration of a triggering condition for performing the beam measurement on the neighbor cell. The triggering condition for performing the beam measurement on the neighbor cell includes one or a combination of the following:

a radio resource management (RRM) measurement result of the serving cell being less than a first threshold;
  a beam measurement result of the serving cell being less than a second threshold;
  a channel quality indicator (CQI) measurement result of the serving cell being less than a third threshold;
  a RRM measurement result of the neighbor cell being greater than a fourth threshold;
  an absolute value of a difference between the RRM measurement result of the neighbor cell and the RRM measurement result of the serving cell being less than a preset threshold.

In an implementation, the beam measurement apparatus 120 further includes a receiving unit 123. The receiving unit 123 is configured to obtain a transmission configuration value of the neighbor cell sent by the network device to which the serving cell belongs.

In another implementation, the transmission configuration value is determined based on the beam measurement result report.

The beam measurement result report includes one or more of a neighbor cell identifier, an antenna panel identifier, a terminal identifier, a group identifier, a sounding reference signal identifier, and a sounding reference signal measurement value.

In an implementation, the beam measurement result report of the neighbor cell is a group-based measurement result report. Multiple sounding reference signals in the group are the sounding reference signals that can be received by the neighbor cell simultaneously, or multiple sounding reference signals in the group are sounding reference signals that cannot be received by neighbor cell simultaneously.

Regarding the apparatus in the above-mentioned example, the specific manner in which each module performs operations has been described in detail in examples of the method, which will not be described in detail here.

Figure 10:
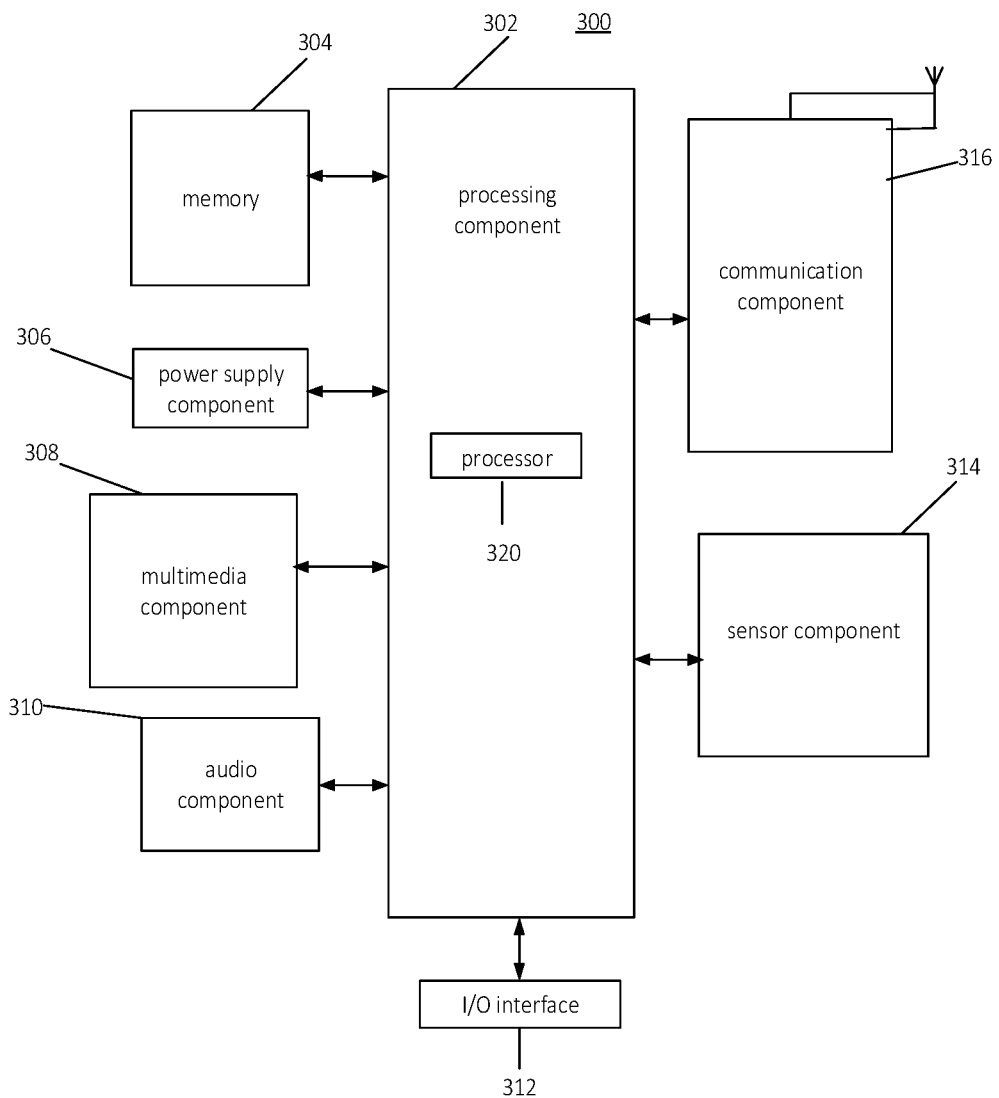
FIG. 10 is a block diagram illustrating a device according to an example.

FIG. 10 is a block diagram illustrating a device 300 for beam measurement according to an example. The device 300 may be the beam measurement apparatus 110 and the beam measurement apparatus 120. The device 300 may be a mobile phone, a computer, a digital broadcast terminal, a messaging device, a game console, a tablet device, a medical device, a fitness device, a personal digital assistant, and the like.

As illustrated in FIG. 10, the device 300 may include one or more of the following components: a processing component 302, a memory 304, a power supply component 306, a multimedia component 308, an audio component 310, an input/output (I/O) interface 312, a sensor component 314, and a communication component 316.

The processing component 302 generally controls the overall operation of the device 300, such as operations associated with display, phone calls, data communications, camera operations, and recording operations. The processing component 302 may include one or more processors 820 to execute instructions to perform all or part of the steps of the methods described above. Additionally, the processing component 302 may include one or more modules that facilitate interaction between the processing component 302 and other components. For example, the processing component 302 may include a multimedia module to facilitate interaction between the multimedia component 308 and the processing component 302.

The memory 304 is configured to store various types of data to support operation at the device 300. Examples of such data include instructions for any application or method operating on the device 300, contact data, phonebook data, messages, pictures, videos, and the like. The memory 304 may be implemented by any type of volatile or nonvolatile storage device or combination thereof, such as static random access memory (SRAM), electrically erasable programmable read only memory (EEPROM), erasable Programmable Read Only Memory (EPROM), Programmable Read Only Memory (PROM), Read Only Memory (ROM), Magnetic Memory, Flash Memory, Magnetic Disk or Optical Disk.

The power supply component 306 provides power to various components of the device 300. The power supply component 306 may include a power management system, one or more power sources, and other components associated with generating, managing, and distributing power to the device 300.

The multimedia component 308 includes a screen that provides an output interface between the device 300 and the user. In some examples, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensor may not only sense the boundaries of a touch or swipe action, but also detect the duration and the pressure associated with the touch or swipe action. In some examples, the multimedia component 308 includes a front-facing camera and/or a rear-facing camera. When the device 300 is in an operation mode, such as a shooting mode or a video mode, the front-facing camera and/or the rear-facing camera may receive external multimedia data. Each of the front-facing and rear-facing cameras can be a fixed optical lens system or have focal length and optical zoom capability.

The audio component 310 is configured to output and/or input audio signals. For example, the audio component 310 includes a microphone (MIC) that is configured to receive external audio signals when the device 300 is in operating modes, such as call mode, recording mode, and voice recognition mode. The received audio signal may be further stored in the memory 304 or transmitted via the communication component 316. In some examples, the audio component 310 also includes a speaker for outputting audio signals.

The I/O interface 312 provides an interface between the processing component 302 and a peripheral interface module, which may be a keyboard, a click wheel, a button, or the like. These buttons may include, but are not limited to: home button, volume buttons, start button, and lock button.

The sensor component 314 includes one or more sensors for providing status assessment of various aspects of the device 300. For example, the sensor component 314 can detect the open/closed state of the device 300, the relative positioning of components, such as the display and keypad of the device 300. The sensor component 314 can detect a change in the position of the device 300 or components of the device 300, the presence or absence of user contact with the device 300, the orientation or acceleration/deceleration of the device 300 and the temperature change of the device 300. The sensor component 314 may include a proximity sensor configured to detect the presence of nearby objects in the absence of any physical contact. The sensor component 314 may also include a light sensor, such as a CMOS or CCD image sensor, for use in imaging applications. In some examples, the sensor component 314 may also include an acceleration sensor, a gyroscope sensor, a magnetic sensor, a pressure sensor, or a temperature sensor.

The communication component 316 is configured to facilitate wired or wireless communication between the device 300 and other devices. The device 300 may access wireless networks based on communication standards, such as WiFi, 2G or 3G, or a combination thereof. In an example, the communication component 316 receives broadcast signals or broadcast related information from an external broadcast management system via a broadcast channel. In an example, the communication component 316 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an implementation, the device 300 may be implemented by one or more application specific integrated circuits (ASICs), digital signal processors (DSPs), digital signal processing devices (DSPDs), programmable logic devices (PLDs), field programmable A gate array (FPGA), controller, microcontroller, microprocessor or other electronic component implementation for performing the above method.

In an implementation, there is also provided a non-transitory computer-readable storage medium including instructions, such as the memory 304 including instructions, executable by the processor 320 of the device 300 to perform the method described above. For example, the non-transitory computer-readable storage medium may be ROM, random access memory (RAM), CD-ROM, magnetic tape, floppy disk, optical data storage device, and the like.

Figure 11:
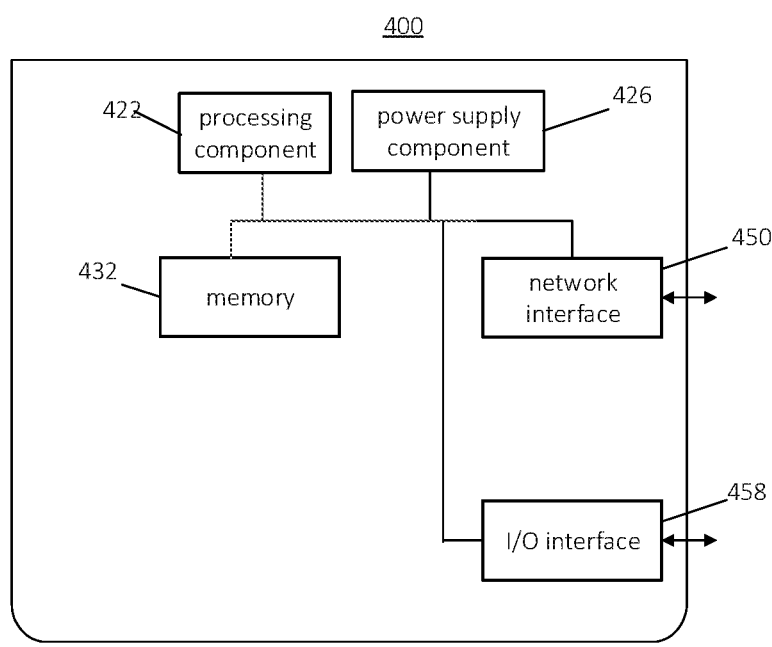
FIG. 11 is a block diagram illustrating a device according to an example.

FIG. 11 is a block diagram illustrating a device 400 for beam measurement according to an example. The device 400 may be the beam measurement apparatus 210 and the beam measurement apparatus 220. For example, the device 400 may be a network device. As illustrated in FIG. 11, the device 400 includes a processing component 422, which further includes one or more processors, and a memory resource represented by a memory 432 for storing instructions executable by the processing component 422, such as an application program. The application program stored in the memory 432 may include one or more modules, each corresponding to a set of instructions. Additionally, the processing component 422 is configured to execute instructions to perform the above-described methods.

The device 400 may include a power component 426 configured to perform power management of the device 400, a wired or wireless network interface 450 configured to connect the device 400 to the network, and an input/output (I/O) interface 458. The device 400 may operate based on an operating system stored in the memory 432, such as Windows Server™, Mac OS X™, Unix™, Linux™, FreeBSD™ or the like.

In an example, there is also provided a non-transitory computer-readable storage medium including instructions, such as the memory 404 including instructions, executable by the processor 420 of the device 400 to perform the method described above. For example, the non-transitory computer-readable storage medium may be ROM, random access memory (RAM), CD-ROM, magnetic tape, floppy disk, optical data storage device, and the like.

It is understandable that in the disclosure, "plurality" refers to two or more, and other quantifiers are similar. "And/or", which describes the association relationship of the associated objects, means that there can be three kinds of relationships. For example, A and/or B means only A, only B, or both A and B. The character "/" generally indicates that the associated objects are an "or" relationship. The singular forms "a," "the," and "the" are intended to include the plural forms as well, unless the context clearly dictates otherwise.

It is further understandable that the terms "first", "second", etc. are used to describe various information, but the information should not be limited to these terms. These terms are only used to distinguish the same type of information from one another, and do not imply a particular order or level of importance. In fact, the expressions "first", "second" etc. can be used interchangeably. For example, the first information may also be referred to as the second information, and similarly, the second information may also be referred to as the first information, without departing from the scope of the disclosure.

It is further understandable that, although the operations in the examples of the disclosure are described in a specific order in the drawings, it should not be construed as requiring that the operations be performed in the specific order shown or the serial order, or requiring to perform all operations shown to obtain the desired result. In certain circumstances, multitasking and parallel processing may be advantageous.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Other examples of the disclosure will readily occur to those skilled in the art upon consideration of the specification and practice of the disclosure disclosed herein. This disclosure is intended to cover any variations, uses, or adaptations of the disclosure that follow the general principles of the disclosure and include common knowledge or techniques in the technical field not disclosed by the disclosure. The specification and examples are to be regarded as exemplary only, with the true scope and spirit of the disclosure being indicated by the following claims.

It is to be understood that the disclosure is not limited to the precise structures described above and illustrated in the accompanying drawings, and that various modifications and changes may be made without departing from the scope thereof. The scope of the disclosure is limited only by the appended claims.

What is claimed is:

1. A beam measurement method, comprising:
    obtaining, by a terminal, a beam measurement result reporting configuration of a neighbor cell, and determining a reference signal configuration of beam measurement of the neighbor cell;
    performing, by the terminal, the beam measurement on the reference signal of the neighbor cell based on the reference signal configuration of the beam measurement, and reporting a beam measurement result of the neighbor cell;
    wherein determining the reference signal configuration of the beam measurement of the neighbor cell comprises:
    obtaining the reference signal configuration of the beam measurement of the neighbor cell from a network device to which a serving cell belongs, wherein the reference signal configuration of the beam measurement of the neighbor cell is determined by the network device to which the neighbor cell belongs based on a reference signal configuration request of the beam measurement sent by the network device to which the serving cell belongs, and
    sending the reference signal configuration of the beam measurement of the neighbor cell to the network device to which the serving cell belongs.

2. The method of claim 1, further comprising:
    receiving a configuration of a triggering condition for performing the beam measurement on the neighbor cell,
    wherein the triggering condition for performing the beam measurement on the neighbor cell comprises:
    a radio resource management (RRM) measurement result of a serving cell being less than a first threshold;
    the beam measurement result of the serving cell being less than a second threshold;
    a channel quality indicator (CQI) measurement result of the serving cell being less than a third threshold;
    a RRM measurement result of the neighbor cell being greater than a fourth threshold; or
    an absolute value of a difference between the RRM measurement result of the neighbor cell and the RRM measurement result of the serving cell being less than a preset threshold.

3. The method of claim 1, wherein determining the reference signal configuration of the beam measurement of neighbor cell comprises:
    based on searched reference signals of the beam measurement of the neighbor cells, determining the reference signal configuration of the beam measurement of the neighbor cell.

4. The method of claim 1, wherein the reference signal of the beam measurement of the neighbor cell is a synchronization signal block (SSB) or a channel state information reference signal (CSI-RS) from the neighbor cell.

5. The method of claim 1, further comprising:
    in response to determining that a time of transmitting data with a serving cell collides with a time of performing the beam measurement on the reference signal of the neighbor cell, maintaining data transmission with the serving cell and stopping performing the beam measurement on the reference signal of the neighbor cell.

6. The method of claim 1, wherein the beam measurement result of the neighbor cell comprises: a neighbor cell identifier, an antenna panel identifier, a group identifier, a reference signal identifier, a reference signal received power of layer 1, a reference signal received quality of layer 1, or a signal to interference & noise ratio of layer 1.

7. The method of claim 1, wherein the beam measurement result of the neighbor cell is a group-based measurement result, wherein multiple reference signals in the group are those that can be received by the terminal simultaneously, or multiple reference signals in the group are those that cannot be received by the terminal simultaneously.

8. The method of claim 1, further comprising:
obtaining a transmission configuration value of the neighbor cell sent by a network device to which a serving cell belongs.

9. A beam measurement method, comprising:
determining and sending, by a network device, a beam measurement result reporting configuration of a neighbor cell and a reference signal configuration of beam measurement of the neighbor cell, wherein the network device is that to which a serving cell of a terminal belongs; and
obtaining a beam measurement result of the neighbor cell;
wherein determining the reference signal configuration of the beam measurement of the neighbor cell comprises:
sending a reference signal configuration request of the beam measurement to the network device to which a neighbor cell belongs; and
acquiring the reference signal configuration of the beam measurement of the neighbor cell sent by the network device to which the neighbor cell belongs.

10. The method of claim 9, further comprising:
configuring a triggering condition for performing beam measurement on the neighbor cell, wherein the triggering condition for performing the beam measurement on the neighbor cell comprises:
a radio resource management (RRM) measurement result being less than a first threshold;
the beam measurement result being less than a second threshold;
a channel quality indicator (CQI) measurement result being less than a third threshold;
the RRM measurement result of the neighbor cell being greater than a fourth threshold; or
an absolute value of a difference between the RRM measurement result of the neighbor cell and the RRM measurement result of a current cell being less than a preset threshold.

11. The method of claim 9, wherein the reference signal of the beam measurement of the neighbor cell is a synchronization signal block (SSB) or a channel state information reference signal (CSI-RS) from the neighbor cell.

12. The method of claim 9, further comprising:
in response to determining that a time of transmitting data with a terminal collides with a time of performing the beam measurement on the reference signal of the neighbor cell, maintaining data transmission with the terminal and stopping performing the beam measurement on the reference signal of the neighbor cell.

13. The method of claim 9, wherein the beam measurement result of the neighbor cell comprises: a neighbor cell identifier, an antenna panel identifier, a group identifier, a reference signal identifier, a reference signal received power of layer 1, a reference signal received quality of layer 1, or a signal to interference & noise ratio of layer 1.

14. The method of claim 9, wherein the beam measurement result of the neighbor cell is a group-based measurement result report of the neighbor cell, wherein multiple reference signals in the group are those that can be received by the terminal simultaneously, or multiple reference signals in the group are those that cannot be received by the terminal simultaneously.

15. The method of claim 9, further comprising:
determining and sending a transmission configuration value of the neighbor cell.

16. A beam measurement device, comprising:
a processor; and
a memory storing processor-executable instructions;
wherein the processor is configured to execute a beam measurement method of claim 1.

17. A beam measurement device, comprising:
a processor; and
a memory storing processor-executable instructions;
wherein the processor is configured to execute a beam measurement method of claim 9.

* * * * *